(12) United States Patent
Ishizuka et al.

(10) Patent No.: US 6,473,184 B1
(45) Date of Patent: Oct. 29, 2002

(54) INTERFEROMETER WHICH DIVIDES LIGHT BEAMS INTO A PLURALITY OF BEAMS WITH DIFFERENT OPTICAL PATHS

(75) Inventors: Ko Ishizuka, Omiya; Hidejiro Kadowaki, Yokohama; Yasushi Kaneda, Urawa; Shigeki Kato; Takayuki Kadoshima, both of Utsunomiya; Sakae Horyu, Hachioji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/562,434

(22) Filed: May 1, 2000

(30) Foreign Application Priority Data

May 10, 1999 (JP) .......................................... 11-128349

(51) Int. Cl.$^7$ ............................................. G01B 9/02
(52) U.S. Cl. ...................................... 356/499; 356/521
(58) Field of Search .............................. 356/521, 488, 356/487, 498, 499; 250/237, 231.14

(56) References Cited

U.S. PATENT DOCUMENTS

| 4,072,423 A |   | 2/1978  | Kimura et al. |
|---|---|---|---|
| 4,870,632 A | * | 9/1989  | Shiono et al. ............. 369/44.2 |
| 5,198,873 A | * | 3/1993  | Ishizuka et al. ............. 356/494 |
| 5,283,434 A |   | 2/1994  | Ishizuka et al. |
| 5,390,022 A |   | 2/1995  | Ishizuk et al. |
| 5,448,358 A |   | 9/1995  | Ishizuka et al. |
| 5,481,106 A |   | 1/1996  | Nyui et al. |
| 5,483,332 A |   | 1/1996  | Takamiya et al. |
| 5,483,377 A |   | 1/1996  | Kaneda et al. |
| 5,498,870 A |   | 3/1996  | Ishizuka |
| 5,502,466 A |   | 3/1996  | Kato et al. |
| 5,557,396 A |   | 9/1996  | Ishizuka et al. |
| 5,569,913 A |   | 10/1996 | Ishizuka et al. |
| 5,621,527 A |   | 4/1997  | Kaneda et al. |
| 5,629,793 A |   | 5/1997  | Takamiya et al. |
| 5,640,239 A |   | 6/1997  | Takamiya, et al. |
| 5,663,794 A |   | 9/1997  | Ishizuka |
| 5,666,196 A |   | 9/1997  | Ishii et al. |
| 5,673,096 A |   | 9/1997  | Dorsel et al. |
| 5,680,211 A |   | 10/1997 | Kaneda et al. |
| 5,737,070 A |   | 4/1998  | Kato |
| 5,737,116 A |   | 4/1998  | Kadowaki et al. |
| 5,754,282 A |   | 5/1998  | Kato et al. |
| 5,774,218 A |   | 6/1998  | Takamiya et al. |
| 5,796,470 A |   | 8/1998  | Ueda et al. |
| 5,815,267 A |   | 9/1998  | Kato et al. |
| 5,880,839 A |   | 3/1999  | Ishizuka et al. |
| 5,926,276 A |   | 7/1999  | Takamiya et al. |
| 5,956,140 A |   | 9/1999  | Ishizuka et al. |

\* cited by examiner

*Primary Examiner*—Samuel A. Turner
(74) *Attorney, Agent, or Firm*—Fitzpatrick, Cella, Harper & Scinto (57) ABSTRACT

An interferometer has a semiconductor laser which oscillates in multiple modes, an optical member for providing a beam from the semiconductor laser with a substantial optical path difference between optical paths partially in one beam, and an interference optical system for causing interference, using the beam having traveled via the optical member.

16 Claims, 5 Drawing Sheets

INTERFEROMETER WHICH DIVIDES LIGHT BEAMS INTO A PLURALITY OF BEAMS WITH DIFFERENT OPTICAL PATHS

BACKGROUND OF THE INVENTION

1. Field of the Invention

The present invention relates to an interferometer making use of the interference phenomenon of light, a displacement measuring apparatus, and an information recording or/and reproducing apparatus using it. The present invention is suitably applicable, particularly, to industrial microlength meters having the resolving power and accuracy of the submicron order, based on application of the interference phenomenon of light, and machine tools and assembling/adjusting equipment utilizing them.

2. Related Background Art

Gage interferometers using lasers have been employed commonly as high-accuracy length measuring systems in various devices ranging from research fields to industry. In general, such systems are required to yield absolute accuracy and gas lasers of stable wavelength are used as light sources thereof.

However, simple gage interferometers using semiconductor lasers are commercially available lately and are showing features of compactness and simplicity. These gage interferometers are constructed generally in the structure based on the principle of the Michelson interferometer, in which a laser beam is emitted from the main body of interferometer to the outside to illuminate a reflector attached to an object to be measured and in which the laser beam is guided back to the original path to undergo interference in the main body of the gage interferometer. A measurable range depends upon coherency of the laser beam and is approximately equal to the coherent length. The gage interferometers using the gas lasers and the single-mode semiconductor lasers normally have the coherent length of several meters or more.

Since these gage interferometers have been applied heretofore to various stages, etc., for FA equipment, it was impossible to apply them to high-resolution measurement of displacement in a microrange and of a microportion of the millimeter order because of the restraints on the size of apparatus. In these fields, for example, where objects to be measured were limited to metal, the displacement was measured using "electrical capacitance sensors" making use of the phenomenon that electrical capacitance varies depending upon spacing between the measured object and the sensor body.

There was, however, a limit to compactification in order to yield high accuracy and high resolving power (high S/N), because the measured objects were metal and because the capacitance was associated with the size of the measured objects (the area of a detected surface). The capacitance sensors are unable to measure the capacitance in a complete contact state, but are able to provide best signals in a close proximity state. Therefore, they have to be adjusted in an almost contact state. This is not so preferable because there is the possibility of damaging the measured object. There are additional limitations to use conditions, for example, the condition in which accurate measurement is allowed only in a state near to a standstill state.

On the other hand, in the case of the gage interferometers using the semiconductor lasers as a light source, the light source itself can be realized in the size of the millimeter order, but the single-mode semiconductor lasers experience the mode hopping phenomenon of switching between oscillation modes depending upon operating environment variations, etc., and thus discontinuously change their interference phases every occurrence of mode hopping when used in the interferometers as they are. This can make it difficult to count changes of interference phases.

The gage interferometers using the commercially available semiconductor lasers as a light source are normally provided with various countermeasures for stabilizing the wavelength to fix the oscillation wavelength in a single mode. One method involves the addition of a temperature control function of a laser by a Peltier device or a heater, but the size, etc., thereof can pose a problem. There is another mode-stabilizing method of returning the laser light to the semiconductor laser by an external mirror or the like, but adjustment and assembly steps become complicated. Another conceivable technique is to form a Bragg diffraction grating structure in the semiconductor laser element itself to raise the wavelength selectivity of the element. However, since the commercially available elements are those for communication fields, they cannot be applied to the gage interferometers as they are.

Meanwhile, the applicant or assignee of the application filed an application to describe an encoder based on the principle of grating interference using a multi-mode semiconductor laser, and the reason for employment thereof is that it is free of the mode hopping phenomenon. Since the multi-mode semiconductor lasers have low coherency, it is necessary to adjust the optical path difference between two coherent beams to near zero as a known technique. However, since the encoder of the grating interference method is based on the principle of varying the phase of the wavefront by moving the diffraction grating, optical path lengths do not vary after once adjusted to an equal length, and thus stable signals to a certain extent are obtained even with use of the multi-mode semiconductor laser.

However, where the multi-mode semiconductor laser is applied to an optical system that varies the optical path lengths, the coherence length is desirably as long as possible in order to increase the measurement range and obtain signals on a stable basis. Even in the case of optical systems in which the optical path lengths are fixed in terms of the principle, such as grating interferometers, laser Doppler velocimeters, and so on, the longer coherence length is rather desirable in order to stabilize the signals in consideration of variations in the optical lengths due to secular change or the like.

SUMMARY OF THE INVENTION

In view of these conventional examples, an object of the present invention is to provide an interferometer capable of yielding interference signals on a stable basis, a displacement measuring apparatus, and an information recording or/and reproducing apparatus using it.

The other objects of the present invention will become apparent in the description of embodiments which follows.

An interferometer according to the invention includes a semiconductor laser which oscillates in multiple modes, an optical member for providing a beam from the semiconductor laser with a substantial optical path difference between optical paths partially in one beam, and an interference optical system for causing interference, using the beam having traveled via the optical member.

A displacement measuring apparatus according to the invention includes a semiconductor laser which oscillates in multiple modes, an optical member for providing a beam from the semiconductor laser with a substantial optical path difference between optical paths partially in one beam, and an interference optical system for causing interference, using the beam having traveled via the optical member. The interference optical system comprises a measurement path and a reference path, and multiplexes two beams having traveled respectively in the two paths to form an interference beam. At least the measurement path runs via a surface to be measured. In addition, the apparatus includes a detector for receiving the interference beam, wherein displacement information of the surface to be measured is obtained from output of the detector.

An information recording or/and reproducing apparatus according to the invention includes a semiconductor laser which oscillates in multiple modes, an optical member for providing a beam from the semiconductor laser with a substantial optical path difference between optical paths partially in one beam, and an interference optical system for causing interference, using the beam having traveled via the optical member. The interference optical system includes a measurement path and a reference path and multiplexes two beams having traveled respectively in the two paths to form an interference beam. At least the measurement path runs via a surface displaced together with a recording or/and reproducing portion which makes access for information recording or/and reproduction to an information recording medium. In addition, the apparatus includes a detector for receiving said interference beam. Displacement information of the recording or/and reproducing portion is obtained from output of the detector, and a control system for carrying out control of relative position of the recording or/and reproducing portion of the information recording medium, based on the displacement information.

A servo track writer according to the invention includes a semiconductor laser which oscillates in multiple modes, a Fresnel zone plate for converging a beam from the semiconductor laser, and an interference optical system for causing interference, using the beam having traveled via the Fresnel zone plate. The interference optical system includes a measurement path and a reference path, and multiplexes two beams having traveled respectively in the two paths to form an interference beam, wherein the beam traveling via the measurement path is reflected by a surface of a head arm supporting a magnetic head in a hard-disk drive unit and the beam traveling via the reference path is reflected by a reference surface. The system also includes a detector for receiving the interference beam, wherein displacement information of the head arm is obtained from output of the detector, and a control system for carrying out control of relative position of the head arm to a hard disk, based on the displacement information, wherein a servo track signal is recorded on the hard disk by the magnetic head on the head arm under the control of relative position.

DETAILED DESCRIPTION OF THE PREFERRED EMBODIMENTS

Figure 1:
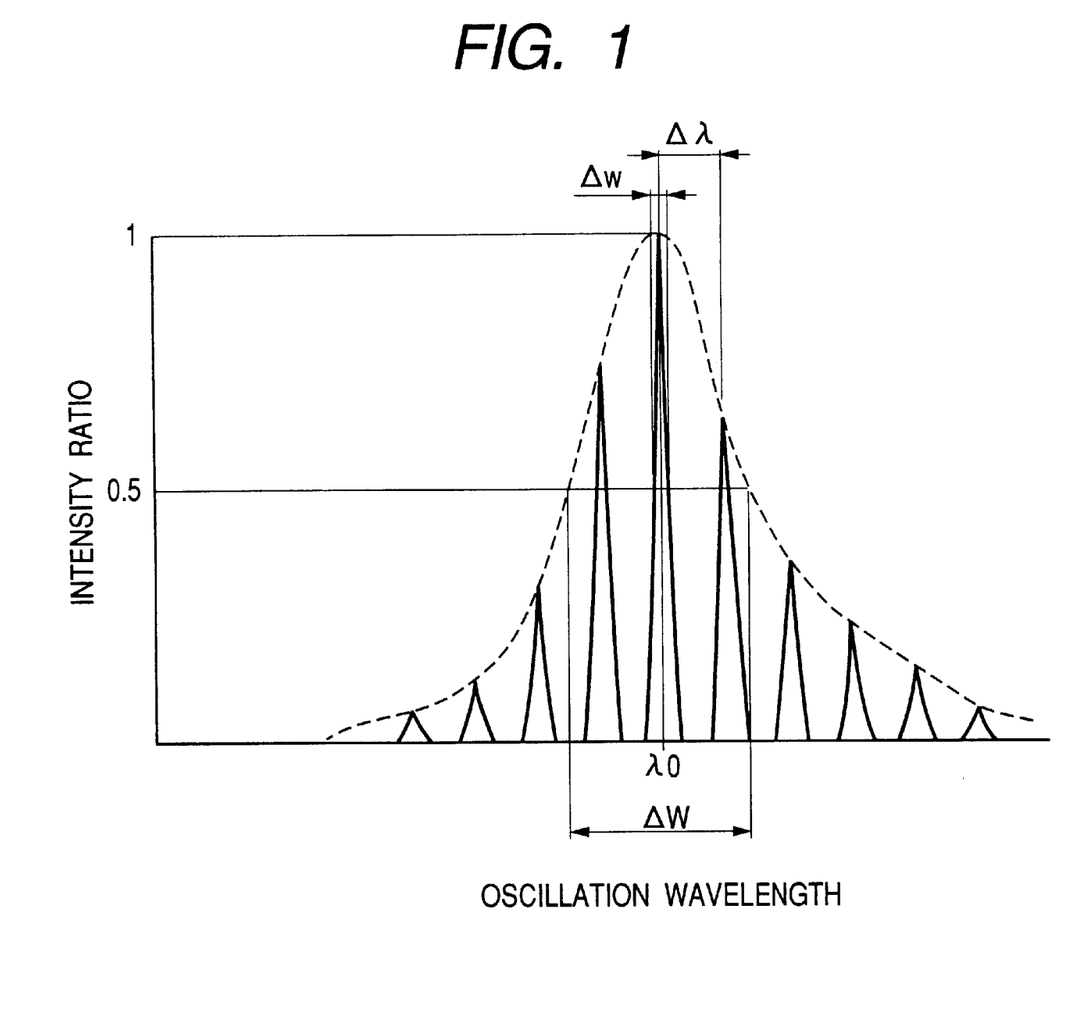
FIG. 1 is a diagram to explain specifications of an oscillation spectrum of a multi-mode semiconductor laser.

FIG. 1 shows an oscillation spectrum of a multi-mode semiconductor laser, wherein the horizontal axis and the vertical axis represent oscillation wavelength and relative intensity, respectively, along a linear scale. As parameters to indicate features of the spectrum, the principal oscillation wavelength is defined as $\lambda 0$, spacing between oscillation modes as $\Delta\lambda$, a full width at half maximum (FWHM) of an envelope (dashed line) connecting tops of a plurality of oscillation modes as $\Delta W$, and a full width at half maximum (FWHM) of each oscillation mode as $\Delta w$. An actual example commercially available is a multi-mode semiconductor laser having the principal oscillation wavelength $\lambda 0=780$ nm, the mode spacing $\Delta\lambda=0.3$ nm, FWHM of envelope $\Delta W=2$ nm, and FWHM of each oscillation mode $\Delta w=0.06$ nm.

Figure 2:
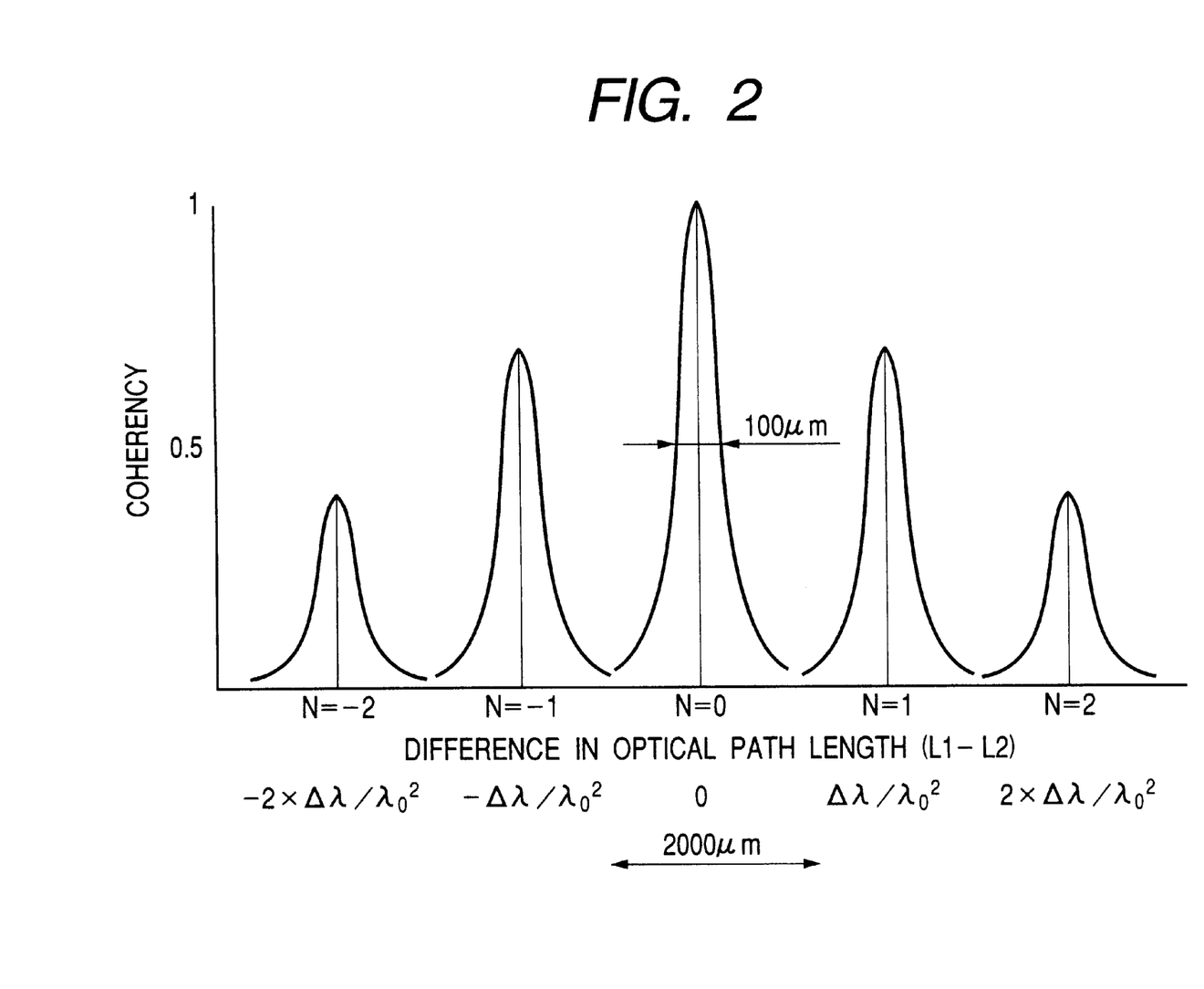
FIG. 2 is a diagram to explain coherency of light from the multi-mode semiconductor laser.

FIG. 2 shows the coherency in the state of the spectrum of FIG. 1, wherein the horizontal axis represents the optical path difference and the vertical axis the coherency. Where the optical path difference is 0, any light source has the coherency of 1, which is maximum. When numbers of coherency peaks are set to be N=0 at the center and N=1, 2, 3, . . . in the increasing direction of the optical path difference, the coherency peak of N=1 appears at the place of about 2000 $\mu$m in the case of the aforementioned commercially available multi-mode semiconductor laser.

In general, if the oscillation spectrum is given, the coherency can be computed by Fourier transform. The reverse thereof is also possible. However, the computation is normally complex, the spectrum itself varies depending upon ambient temperature and driving conditions, and there also exist differences among devices. Therefore, Applicant carried out studies on an approach of expressing the state of the oscillation spectrum of the semiconductor laser by some parameters, expressing places off the optical path difference of 0 by use of the parameters, using the parameters $\lambda 0$, $\Delta\lambda$, $\Delta W$, and $\Delta w$ of the spectrum of the semiconductor laser, and introducing equations for coherency given by the respective parameters.

As a result, the inventor found out the expression of $|L1-L2|\cong N/\{1/\lambda 0-1/(\lambda 0+\Delta\lambda)\}=N\cdot\lambda 02/\Delta\lambda$ as a parameter to determine the positions of coherency peaks N=1, 2, 3, . . . (the optical path difference). Further, the inventor also found out the expression of $|L1-L2|\cong 0.6\times\lambda 02/\Delta W$ as a parameter to determine FWHM of each coherency peak (the measurement range in the form of the gage interferometer). It is, however, noted that the value of 0.6 is for the Gaussian shape of the envelope connecting the peaks of the respective oscillation modes and varies more or less depending upon change in the shape.

In the embodiment described hereinafter, the apparatus is constructed, particularly, so as to make the width of the coherency peak near the optical path difference of zero out of the coherency peaks as wide and gentle as possible.

FIG. 2 shows the coherent length of about 100 $\mu$m, and the principle of expanding it to several times or more will be described below.

In the ordinary refracting lenses, because of the spherical shape etc., wave-optic path lengths of the wavefront of rays passing through the central part are equal to those of the wavefront of rays passing through the marginal part. In contrast with it, in the case of diffracting lenses (elements that effect conversion into a converging/diverging state of light by diffraction instead of refraction) typified by a Fresnel zone plate, the wave-optic phase of the wavefront of rays passing through the central part is simply coincident with that of the wavefront of rays passing through the marginal part, but optical paths of convergent rays from the marginal part are longer than those from the central part.

This phenomenon also appears similarly in the case of Fresnel lenses which are lenses making use of their refracting action. Namely, the Fresnel lenses are lenses in which the intrinsic lens function is split into concentric circle zones and in which their refracting surfaces are arranged so as to be approximately flat. Therefore, path lengths increase stepwise from the central part to the marginal part in practice.

In the diffracting lenses, because of their stepwise structure etc., the optical path differences demonstrate shifts of $\lambda$, $2\lambda$, $3\lambda$, ... with respect to the reference at the center. At the place where the converging light illuminates an object to be measured, the rays having passed through the marginal part illuminate the place with a time lag behind the rays having passed through the central part of the diffracting lens. Therefore, the components of optical path lengths different by integral multiples of the wavelength are superimposed there. As a result, noting two split beams, a beam component arriving with a lag of several wavelengths from the marginal part of the diffracting lens in one of the split beams demonstrates high coherence against light having passed through the center of the diffracting lens in the other split beam provided with the longer path difference than the aforementioned beam by the several wavelengths. This results in extending the apparent coherence length by the several wavelengths.

Figure 3:
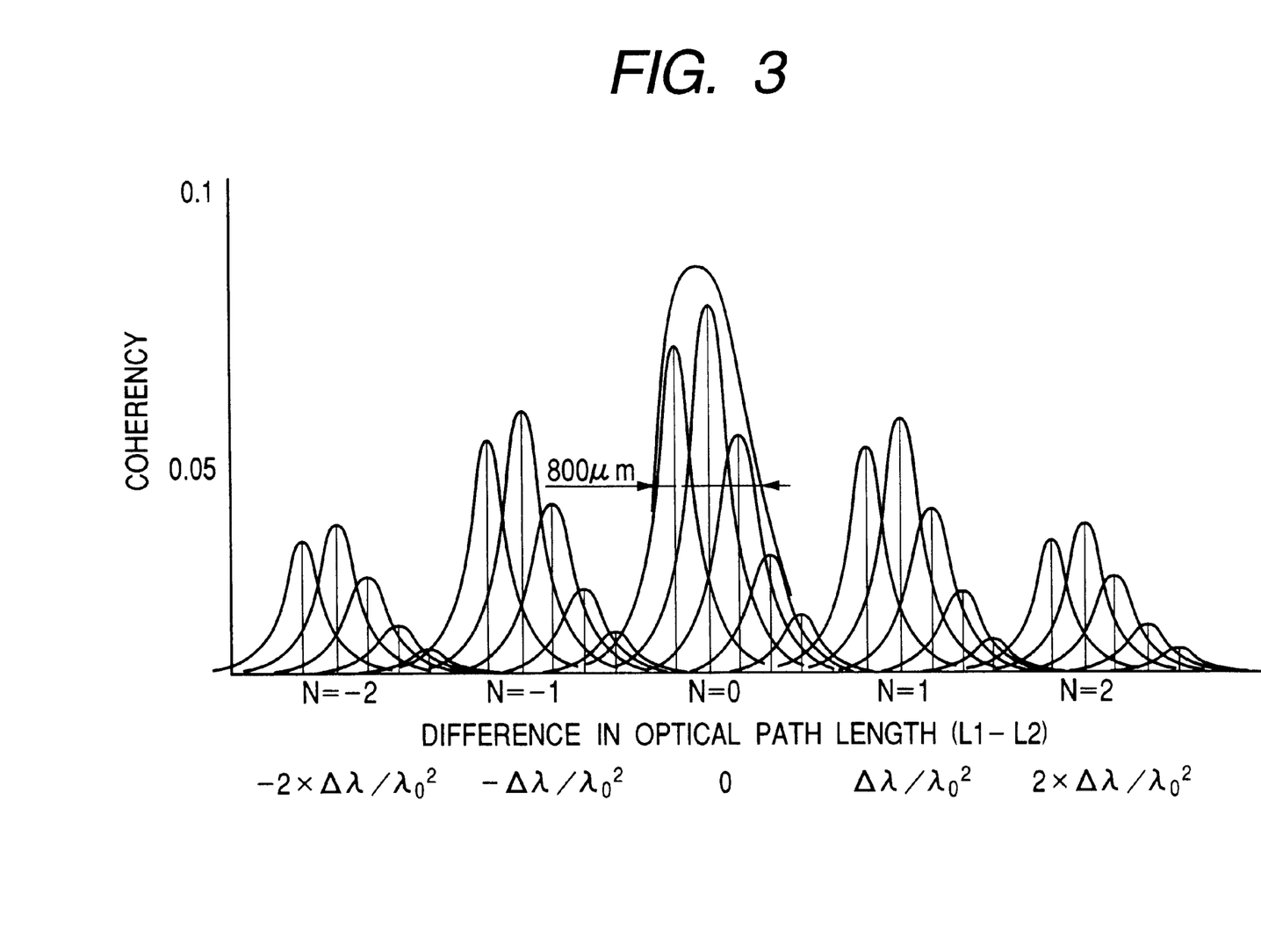
FIG. 3 is a diagram to explain coherency in an embodiment of the present invention.

Since a laser beam generally has the Gaussian distribution of intensities in a cross section thereof, the intensity of light passing the center is strong and the intensity decreases toward the periphery. Supposing a beam has the coherence as illustrated in FIG. 2, a theoretical coherency spectrum of the converging light emerging from the diffracting lens will be obtained by adding graphs of coherency spectra shifted laterally by the optical path differences, based on inclusion of influence of the intensity distribution. However, the coherent peak heights are lowered naturally and the contrast is also lowered as a result of interference. FIG. 3 is a diagram to show such operation, in which FWHM of the center envelope is 800 $\mu$m. Namely, the apparent coherence length in this case is eight times that in the original state.

Figure 4:
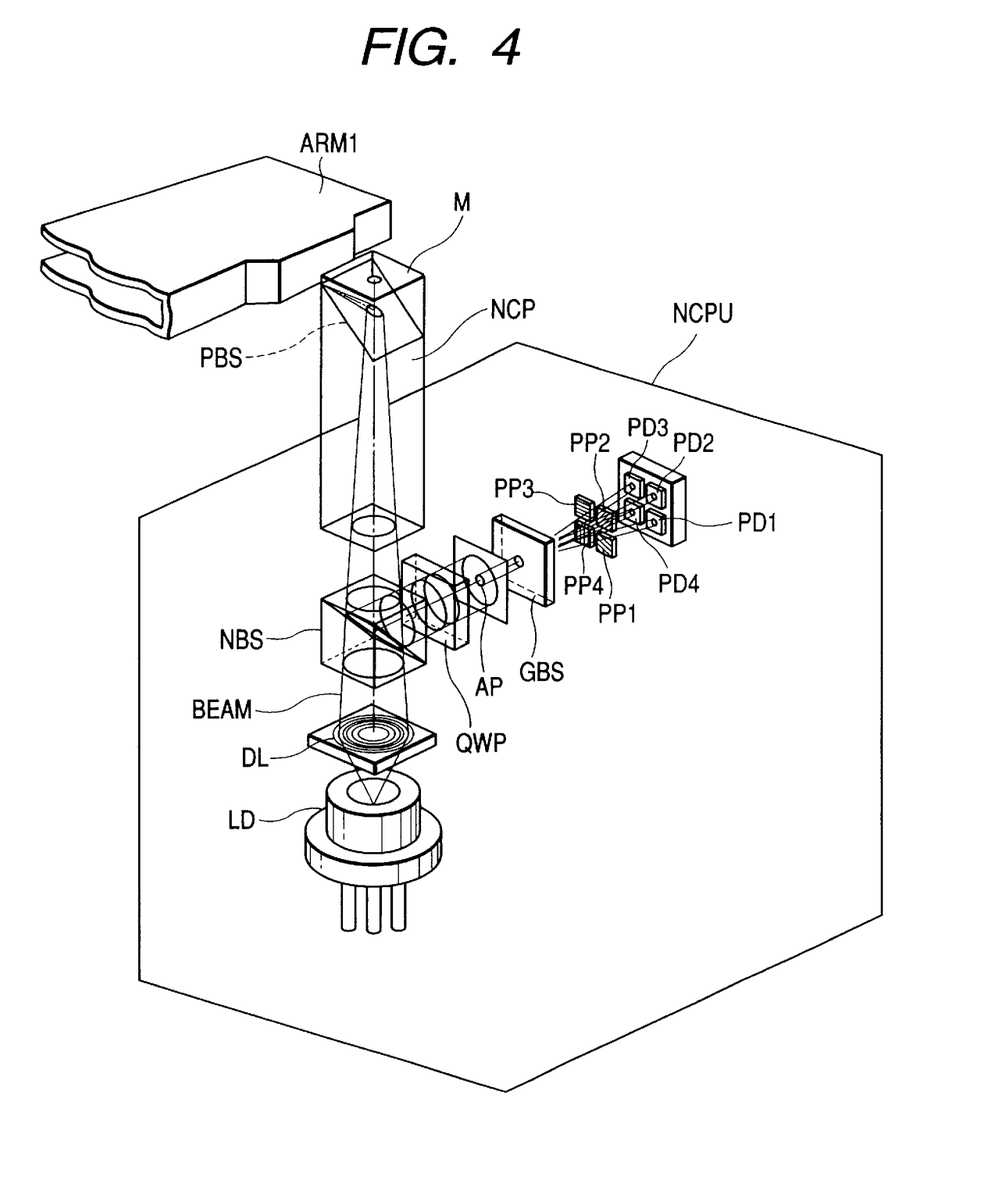
FIG. 4 is a diagram to explain the structure of a micro-displacement measuring device in the first embodiment of the present invention.

FIG. 4 is a schematic, structural diagram to show the structure of an application example of the present invention to a microdisplacement measuring device utilizing the interferometer, which is the interferometer of the first embodiment of the present invention. In the present embodiment the light source LD is a multi-mode semiconductor laser and a reference reflecting surface M is provided on an end face of a polarization beam splitter prism PBS.

The laser beam from the light source LD is converted into a gently converging beam by a diffracting lens (a Fresnel zone plate herein) DL to enter a probe-shaped prism NCP, and then the beam is split into two beams by a surface of the polarization beam splitter PBS. One beam is reflected by the reflecting film M on the end face of the prism and the other beam leaves a side face of the prism to be reflected by a side face of an object to be measured ARM1, placed in a space a predetermined distance (a specific numerical example of which is about 1 mm) apart from the side face of the prism.

The reflected beams travel in their respective original paths back to the polarization beam splitter PBS to be multiplexed again there at their wavefronts. At this time the wave-optic path difference between the two beams is close to zero on the optical axis (at the center of the beams). Therefore, as illustrated in FIG. 3, the interference phenomenon in a broad sense (the wavefronts are able to be multiplexed on a vector basis: though no bright/dark pattern signal appears here because planes of polarization of the beams are perpendicular to each other) occurs in the range of the optical path difference according to the coherency of the multiplexed beams.

The multiplexed light is taken into a path different from that from the light source by a non-polarization beam splitter NBS to be guided through a quarter wave plate QWP, thereby being converted into a linearly polarized light beam with rotation of the direction of linearly polarized light according to deviation (phase deviation) between the wavefronts of the two beams constituting the multiplexed light. This light (spherical wave) is guided through a pinhole AP for allowing only substantially identical phase portions to pass therethrough and thereafter is divided into four beams by a four-dividing diffraction grating GBS (which is constructed, for example, of a diffraction grating of two-dimensional arrangement or the like). These four split beams (each of which is a linearly polarized light beam with rotation of the axis of polarization thereof) are guided through respective polarizer plates PP1, PP2, PP3, PP4 having their respective directions of polarization different 45° from each other, whereby a maximum transmitted beam is obtained at the timing when the polarization axis matches with that of the polanrizer in each beam. Each beam is received and detected by a corresponding light-receiving element PD1 to PD4. In practice, each beam is converted into an electric signal by a photoelectric converter such as a photodiode or the like, the electric signal is then amplified, and thereafter the electric signal is outputted.

The phase of the bright/dark pattern signal (interference phase) is given as a result of multiplying $2\pi$ by a value resulting from division of the optical path difference by the principal wavelength $\lambda 0$. As for the period of the bright/dark pattern change, one period of bright/dark pattern change takes place when the relative distance to the exit end of the polarizing prism varies by the length equivalent to half wavelength. Therefore, supposing the principal wavelength $\lambda 0$ of the semiconductor laser is 0.78 $\mu$m, the bright/dark pattern signal will be yielded in the sine wave shape having the period of 0.39 $\mu$m.

Since the polarizers PP1 to PP4 are arranged with their polarization axes 45° apart from each other, phases of bright and dark patterns of the beams incident to the respective light-receiving elements PD1 to PD4 deviate 90° apart from each other. Namely, there appears the deviation of 180° between the phases of the bright and dark patterns of the beams incident to the light-receiving elements PD1, PD2 and there appears the deviation of 180° between the phases of the bright and dark patterns of the beams incident to the light-receiving elements PD3, PD4. Two-phase cyclic signals (A, B) with stable offset can be detected by electrically differential-amplifying the beam signals of these combinations by unrepresented circuitry. On this occasion there is the phase difference of 90° between the cyclic signals A, B after the differential detection. This stability of offset is important for detecting an amount of movement of the detected object in high resolving power by electrical interpolation based on the sine signals. A displacement amount of the detected object ARM1 relative to the measuring unit MCPU is measured by forming pulse signals from the two-phase cyclic signals by an unrepresented signal processing system and counting the pulses in consideration of a displacement direction.

Figure 5:
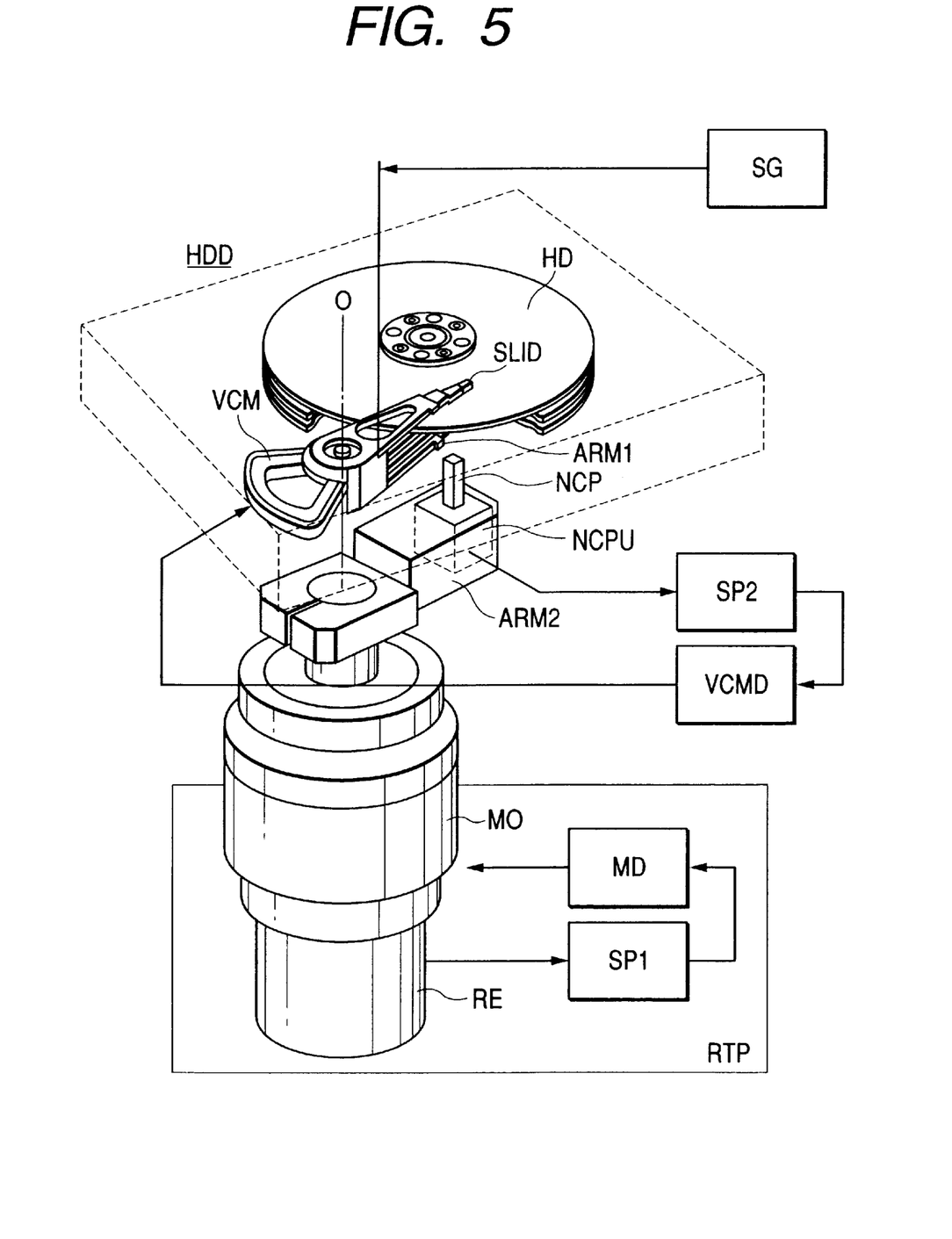
FIG. 5 is a diagram to explain the structure of an application example of the first embodiment.

FIG. 5 shows an example of application of the microdisplacement measuring apparatus of FIG. 4 to an apparatus for measuring displacement of a magnetic head arm in a servo track signal writing system (servo track writer) with high accuracy, which needs to be used in production of hard-disk drive units for computers. In this example the detected object ARM1 is an arm for a magnetic head.

The hard-disk drive unit HDD is composed of a hard disk HD, a magnetic head arm ARM1, a slider SLID, a voice coil motor VCM, and so on. A magnetic recording medium is evaporated on the surface of the hard disk HD in a case of the hard disk drive HDD, and the hard disk HD is always rotating at high speed about a spindle. A magnetic head is located in close proximity to the surface of the hard disk HD. The magnetic head is assembled in an almost rectangular parallelepiped portion called the slider SLID attached to the tip of the arm ARM1 with the rotation center 0 outside the hard disk HD, whereby it can move approximately in the radial direction relative to the hard disk HD above it. Therefore, magnetic information can be written or read out at any position (track) on the surface of the hard disk of the disk shape by means of the rotating hard disk HD and the arcuately moving magnetic head.

The unit is constructed in the structure in which the magnetic head arm ARM1 having the rotation axis 0 outside the hard disk HD as described above is mounted, the slider SLID attached to the tip of the arm is located with a gap of several micrometers (or less) opposite to the hard disk surface, and the magnetic head moves along an arcuate locus with rotation of the magnetic head arm ARM1. The rotation is effected by letting an electric current flow in the voice coil motor VCM.

SG designates a signal generator for generating a servo track signal to be written in the hard disk, and this servo track signal is written via the magnetic head of the slider SLID into the hard disk.

In this system an arm ARM2 is provided with the aforementioned measurement unit NCPU. The arm ARM2 is arranged to rotate about a rotational shaft having the same rotation center as the rotation axis 0 of the magnetic head arm ARM1. The probe-shaped prism NCP is arranged so that the beam exit surface thereof located inside the hard disk drive unit HDD and opposed to the magnetic head arm ARM1 can be rotationally moved about the same rotation center as the axis of the magnetic head arm ARM1. The rotating position of the measurement unit NCPU is measured by a high-resolving-power rotary encoder RE attached to the rotation shaft of ARM2.

Non-contact micropositioning is carried out according to the following procedures in the system configuration as described above.

Under control of signal processor SP1 the measurement unit NCPU is first rotated by a small angle corresponding to a displacement amount of the magnetic head for switching of servo track signal writing position by use of motor M0 and motor driver MD. The rotation shafts of the motor M0 and rotary encoder RE are coupled to each other and feedback control is carried out so as to effect high-accuracy rotational positioning without deviation from a designated angle by the system of signal processor SP1, motor M0, and motor driver MD using signals detected by the encoder RE.

On the other hand, variation amount information of relative gap to the side face of the magnetic head arm ARM1, outputted from the measurement unit NCPU, is transferred to a signal processor SP2, and under control of the signal processor SP2, servo control of the rotational position of the magnetic head arm ARM1 is carried out so as to keep the gap between them at a predetermined gap by use of the voice coil motor VCM and voice coil motor driver VCMD. This results in accurately rotating the magnetic head arm ARM1 by the small rotational angle designated by the signal processor SP1.

In this way the magnetic head arm is indirectly positioned finely and precisely and servo track signals are recorded repeatedly on the hard disk on the occasion of stops, thereby realizing the high-density servo track signal writing system.

The magnetic recording method on the surface of the hard disk is as follows. First, the surface is divided into a plurality of circular tracks of concentric circles having different radii with respect to the rotation center of the hard disk. Each of the circular tracks is further divided into a plurality of arcs, and data is finally recorded or reproduced in time series along the circumferential direction in or out of the plurality of arcuate regions.

A recent trend is to seek an increase in memory capacity of the hard disk and there are demands for attainment of higher density of recorded information in the hard disk. An effective means for increasing the density of recorded information in the hard disk is to narrow the width of the tracks separated as the concentric circles so as to increase the recording density in the radial direction. The recording density in the radial direction is expressed by track density per inch TPI (tracks/inch) and currently available densities are about 8000 TPI. This means that the track spacing is about 3.125 $\mu$m.

For indexing such fine track pitch, it is necessary to position the magnetic head (slider) in the resolution (0.06 $\mu$m) approximately equal to 1/50 of the track width in the radial direction of the hard disk HD and preliminarily write the servo track signals therein. An important technique herein is to write the servo track signals successively while positioning the head as discussed within short time. In the present embodiment, the very compact probe-shaped measuring unit is located near the magnetic head in order to measure movement of the magnetic head arm with high accuracy by the optical means, whereby the present embodiment can realize the measuring apparatus capable of gaining signals readily by the simple setting.

Particularly, the light source employed is the light source like the semiconductor laser to be operated in multiple modes, so as to prevent measurement errors caused by variation in the wavelength due to the mode hopping, and in use of such a multi-mode semiconductor laser it is arranged in the aforementioned structure to extend the apparent coherence length, so as to extend the working distance, thereby yielding further effects of convenience of use, improvement in the measurement range, and so on. For repeatedly mounting and dismounting the measuring unit in hard-disk manufacturing lines to carry out measurement operations, the measurement range, if narrow, will affect operability and productivity. Therefore, application of the invention to such equipment is particularly effective, because of attainment of all the high resolving power, compactness, and workability.

The embodiment of FIG. 5 shows the example of the servo track writer as an information recording device, but similar structure can also be applied to an information reproducing apparatus, for example, an apparatus for reading and checking information written in the hard disk, and further to an apparatus having both functions.

Further, the above embodiment was explained using the Fresnel zone plate as a diffracting lens, but it may also be replaced by another element, for example, a hologram element. Use as a lens is a desired form, but it can be any element capable of generating a substantial optical path difference partially between two paths in one beam. Thus the element is not limited to lenses if the function is realized by a diffraction grating of unfixed grating pitches. Further, the diffracting lens may also be replaced by the aforementioned Fresnel lens. In this case, the Fresnel lens can be constructed in such structure as to match phase differences of the wavefronts of beams from respective refracting surfaces with integral multiples of $\lambda$.

Further, the interferometers are not limited to only Michelson interferometers, but can also be applied to Fizeau interferometers, grating interferometers, laser Doppler velocimeters, and so on.

The embodiments described above can accomplish the following effects.

1. In the interferometers using light the high resolving power and high accuracy can be realized in non-contact from the principle.
2. Since the multi-mode semiconductor laser is used as a light source, the apparatus is compact and free of a malfunction due to the mode hopping.
3. Since the measurement range can be set wide over the characteristics of the light source itself, it is easy to perform pulling into the measurement area, adjustment, and so on.

What is claimed is:

1. An interferometer comprising:
   a semiconductor laser which oscillates in multiple modes;
   an optical member which divides a beam from the semiconductor laser into a plurality of beams with different optical paths so as to cause an optical path difference; and
   an interference optical system for causing interference, using the beam having traveled via the optical member.

2. The interferometer according to claim 1, wherein said optical member comprises a diffraction grating of unfixed pitches.

3. The interferometer according to claim 1, wherein said optical member is a Fresnel lens or a diffracting lens.

4. The interferometer according to claim 3, wherein a beam condensed by said Fresnel lens or said diffracting lens is guided to said interference optical system.

5. The interferometer according to claim 1, wherein said interference optical system has any one form selected from a Michelson interferometer, a Fizeau interferometer, a grating interferometer, and a laser Doppler velocimeter.

6. A displacement measuring apparatus comprising:
   a semiconductor laser which oscillates in multiple modes;
   an optical member which divides a beam from the semiconductor laser into a plurality of beams with different optical paths so as to cause an optical path difference;
   an interference optical system for causing interference, using the beam having traveled via said optical member, said interference optical system comprising a measurement path and a reference path, said interference optical system multiplexing two beams having traveled respectively in the two paths to form an interference beam, wherein at least the measurement path runs via a surface to be measured; and
   a detector for receiving the interference beam, wherein displacement information of the surface to be measured is obtained from an output of said detector.

7. The apparatus according to claim 6, wherein said optical member comprises a diffracting grating of unfixed pitches.

8. The apparatus according to claim 6, wherein said optical member is a Fresnel lens or a diffracting lens.

9. The apparatus according to claim 8, wherein a beam condensed by said Fresnel lens or said diffracting lens is substantially converged on the surface to be measured.

10. The apparatus according to claim 6, wherein said interference optical system has any one form selected from a Michelson interferometer, a Fizeau interferometer, a grating interferometer, and a laser Doppler velocimeter.

11. An information recording or/and reproducing apparatus comprising:
    a semiconductor laser which oscillates in multiple modes;
    an optical member which divides a beam from the semiconductor laser into a plurality of beams with different optical paths so as to cause an optical path difference;
    an interference optical system for causing interference, using the beam having traveled via the optical member, said interference optical system comprising a measurement path and a reference path said interference optical system multiplexing two beams having traveled respectively in the two paths to form an interference beam, wherein at least the measurement path runs via a surface displaced together with a recording or/and reproducing portion which provides for information recording or/and reproduction to an information recording medium;
    a detector for receiving the interference beam, wherein displacement information of said recording or/and reproducing portion is obtained from output of said detector; and
    a control system for carrying out control of relative position of said recording or/and reproducing portion to said information recording medium, based upon the displacement information.

12. The apparatus according to claim 11, wherein said optical member comprises a diffraction grating of unfixed pitches.

13. The apparatus according to claim 11, wherein said optical member is a Fresnel lens or a diffracting lens.

14. The apparatus according to claim 13, wherein a beam condensed by said Fresnel lens or said diffracting lens is substantially converged on the surface.

15. The apparatus according to claim 11, wherein said interference optical system has any one form selected from a Michelson interferometer, a Fizeau interferometer, a grating interferometer, and a laser Doppler velocimeter.

16. A servo track writer comprising:
    a semiconductor laser which oscillates in multiple modes;
    a Fresnel zone plate for converging a beam from said semiconductor laser;
    an interference optical system for causing interference, using the beam having traveled via said Fresnel zone plate, said interference optical system comprising a measurement path and a reference path, said interference optical system multiplexing two beams having traveled respectively in the two paths to form an interference beam, wherein the beam traveling via the measurement path is reflected by a surface of a head arm supporting a magnetic head in a hard-disk drive unit and the beam traveling via the reference path is reflected by a reference surface;
    a detector for receiving the interference beam, wherein displacement information of the head arm is obtained from output of the detector; and
    a control system for carrying out control of relative position of said head arm to a hard disk, based on the displacement information, wherein a servo track signal is recorded on the hard disk by the magnetic head on the head arm under the control of relative position.

* * * * *

UNITED STATES PATENT AND TRADEMARK OFFICE
CERTIFICATE OF CORRECTION

PATENT NO. : 6,473,184 B1
DATED : October 29, 2002
INVENTOR(S) : Ko Ishizuka et al.

It is certified that error appears in the above-identified patent and that said Letters Patent is hereby corrected as shown below:

Column 4,
Line 33, "Applicant" should read -- Applicants --; and
Line 41, "inventor" should read -- inventors --.

Column 6,
Line 26, "polanrizer" should read -- polarizer --.

Column 8,
Line 7, "circules" should read -- circles --.

Signed and Sealed this

Eighteenth Day of November, 2003

JAMES E. ROGAN
*Director of the United States Patent and Trademark Office*